United States Patent
Otsuka

(10) Patent No.: US 9,749,648 B2
(45) Date of Patent: Aug. 29, 2017

(54) MOVING IMAGE PROCESSING APPARATUS

(71) Applicant: Socionext INC., Yokohama-shi, Kanagawa (JP)

(72) Inventor: Tatsushi Otsuka, Kawasaki (JP)

(73) Assignee: SOCIONEXT INC., Yokohama (JP)

( * ) Notice: Subject to any disclaimer, the term of this patent is extended or adjusted under 35 U.S.C. 154(b) by 657 days.

(21) Appl. No.: 14/038,042

(22) Filed: Sep. 26, 2013

(65) Prior Publication Data

US 2014/0133568 A1 May 15, 2014

(30) Foreign Application Priority Data

Nov. 9, 2012 (JP) .................................. 2012-247056

(51) Int. Cl.
H04N 19/436 (2014.01)
H04N 19/513 (2014.01)

(52) U.S. Cl.
CPC ......... *H04N 19/436* (2014.11); *H04N 19/513* (2014.11)

(58) Field of Classification Search
CPC .............................................. H04N 19/00696
See application file for complete search history.

(56) References Cited

U.S. PATENT DOCUMENTS

| 6,720,997 B1 | 4/2004 | Horie et al. |
| 2007/0091120 A1 | 4/2007 | Oura |
| 2007/0291840 A1* | 12/2007 | Tsuru .................. H04N 19/172 375/240.12 |
| 2008/0002063 A1* | 1/2008 | Kimura ..................... G06T 5/50 348/607 |
| 2010/0157093 A1* | 6/2010 | Fuchikami ........... H04N 5/2357 348/226.1 |
| 2014/0079327 A1* | 3/2014 | Diard .................... A63F 13/355 382/233 |

FOREIGN PATENT DOCUMENTS

| JP | 11-196299 A | 7/1999 |
| JP | 2007-067499 A | 3/2007 |
| JP | 2007-108447 A | 4/2007 |
| JP | 2009-294273 A | 12/2009 |

* cited by examiner

*Primary Examiner* — Obafemi Sosanya
(74) *Attorney, Agent, or Firm* — Arent Fox LLP

(57) ABSTRACT

A moving image processing apparatus has an encoder unit configured to include a plurality of encoders which respectively encode a plurality of divided images into which images of a moving image are divided in such a manner that each divided image includes an overlapped area to generate encoded divided image data; and a decoder unit configured to include a plurality of decoders which respectively decode the plurality of encoded divided image data inputted from the encoder unit and respectively extract information on motion vectors of the divided images; and a composition unit which blends a plurality of decoded divided images decoded and generated by the plurality of decoders respectively in the overlapped area to output the images of the moving image. And the composition unit determines a blend ratio of the overlapped area based on the information on the motion vectors.

13 Claims, 16 Drawing Sheets

FIG. 16
(1) CASE WHERE A BIT RATE TO BE SET IS HIGH: OVERLAPPED AREA WIDTH IS NARROW
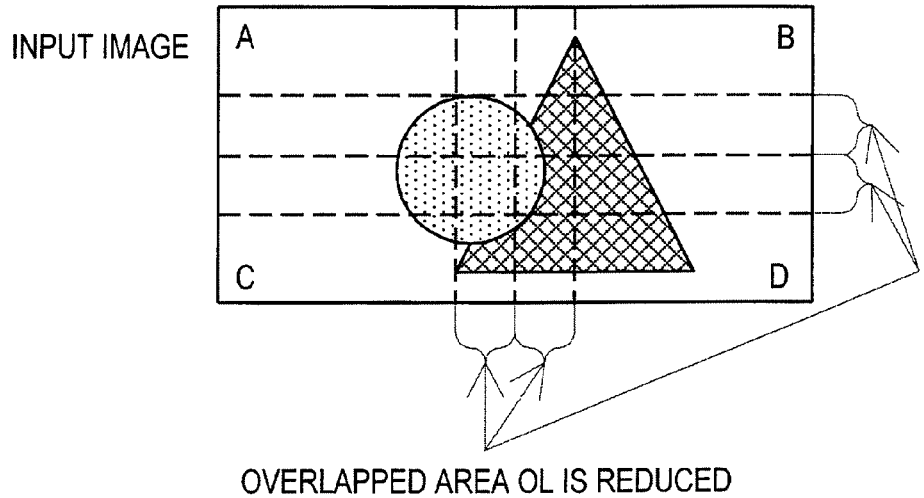
OVERLAPPED AREA OL IS REDUCED
(2) CASE WHERE A BIT RATE TO BE SET IS LOW: OVERALPPED AREA WIDTH IS WIDE
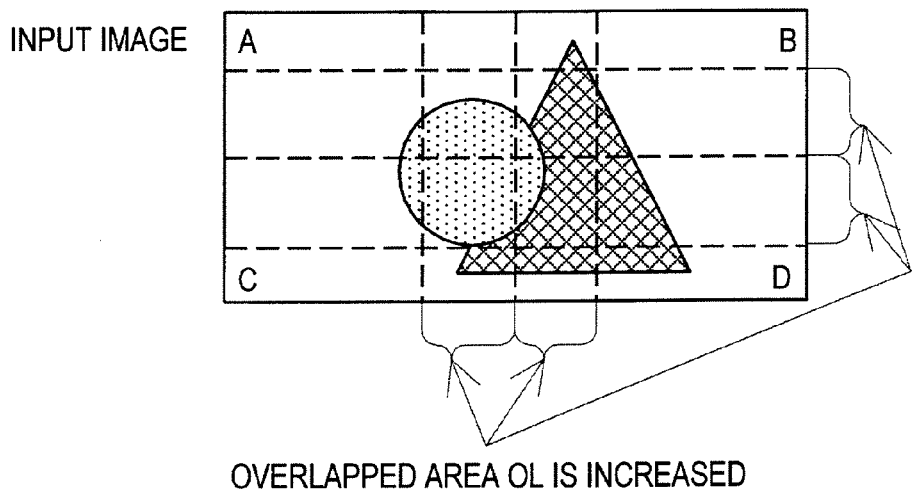
OVERLAPPED AREA OL IS INCREASED

MOVING IMAGE PROCESSING APPARATUS

CROSS-REFERENCE TO RELATED APPLICATION

This application is based upon and claims the benefit of priority of the prior Japanese Patent Application No. 2012-247056, filed on Nov. 9, 2012, the entire contents of which are incorporated herein by reference.

FIELD

The present invention relates to a moving image processing apparatus.

BACKGROUND

A moving image processing apparatus encodes moving image data constituting a video to compress the moving image data, and decodes the compressed streaming data to generate the original moving image data. Regarding widespread moving image compression formats such as MPEG-2, MPEG-4, and H.264, an encoder converts the moving image data constituting the image into motion vector data based on the correlation between the current image and the past image or the future image in terms of time, and data in which DCT (discrete cosine transform) processing, quantization processing, compression processing are applied to a differential image between the image generated based on the motion vector and the original image, or to a non-correlated image that is not generated based on the motion vector. Then, the compressed streaming data is transmitted via a transmission medium or stored in a storage medium. Also, the decoder decodes the streaming data to generate the original moving image data.

Encoding/decoding technologies for high-definition television have already been widespread in digital broadcasting. The high-definition moving images have the resolution of 2K1K (1920 by 1080), encoders and decoders, which have already been widespread, perform the processing for the moving image data having the resolution.

On the other hand, as next-generation high-resolution moving image data, a moving image format having the resolution of 4K2K or 8K4K, which is four times, or 16 times higher than the resolution of 2K1K of the high-definition moving image, has been proposed and developing.

It have been proposed that a plurality of existing encoders and decoders for high-definition moving images are provided, in place of expensive, exclusive encoders and decoders, and the moving image data made up of ultra-high-definition images such as 4K2K and 8K4K are processed in such a manner that a screen is divided into areas having the resolution of 2K1K, and each of the encoders and decoders processes the moving image data in parallel. This configuration realizes the moving image processing apparatus with good cost performance. For example, the following patent documents disclose the moving image processing apparatus (see Patent Document 1: Japanese Unexamined Patent Application Publication No. 2007-67499, Patent Document 2: Japanese Unexamined Patent Application Publication No. H11-196299, Patent Document 3: Japanese Unexamined Patent Application Publication No. 2007-108447, Patent Document 4: Japanese Unexamined Patent Application Publication No. 2009-294273).

SUMMARY

However, when one screen is divided into a plurality of image areas, and the plurality of encoders and decoders respectively perform the processing for a plurality of divided images, the image quality of the peripheral areas of the divided images of 2K1K to be divided deteriorates. Further, since each encoder encodes each divided image in accordance with the content of the image, the image quality on both sides of the boundary between the decoded divided images. Accordingly, when the decoder composes the decoded divided images, the line of boundary between the divided images becomes visible, which causes the deterioration in image quality of the composed images.

In the Patent Document 1, it has been proposed that one screen is divided into a plurality of image areas inclusive of an overlapped area, and a plurality of encoders encode images, and a plurality of decoders decode the images. Then, the decoders discards the overlapped area out of the peripheral areas where the image quality of the decoded divided images deteriorates, thereby avoiding the deterioration of the image quality on the line of boundary between the composed images.

However, since the encoding processing for the adjacent divided images differs based on each image, the image qualities in the boundary portion between the decoded adjacent divided images are different, and the boundary portion of the composed image becomes not natural. That is, when the image quality of one of the divided images is high, but the image quality of the other of the divided images is low, unnaturalness appears in the boundary portion of the composed images.

According to an embodiment, a moving image processing apparatus comprises an encoder unit configured to include a plurality of encoders which respectively encode a plurality of divided images into which images of a moving image are divided in such a manner that each divided image includes an overlapped area to generate encoded divided image data; and a decoder unit configured to include a plurality of decoders which respectively decode the plurality of encoded divided image data inputted from the encoder unit and respectively extract information on motion vectors of the divided images; and a composition unit which blends a plurality of decoded divided images decoded and generated by the plurality of decoders respectively in the overlapped area to output the images of the moving image; wherein the composition unit determines a blend ratio of the overlapped area based on the information on the motion vectors.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 16 is a diagram illustrating the relation between the bit rate and the overlapped area width OLW in the second embodiment.

DESCRIPTION OF EMBODIMENTS

Figure 1:
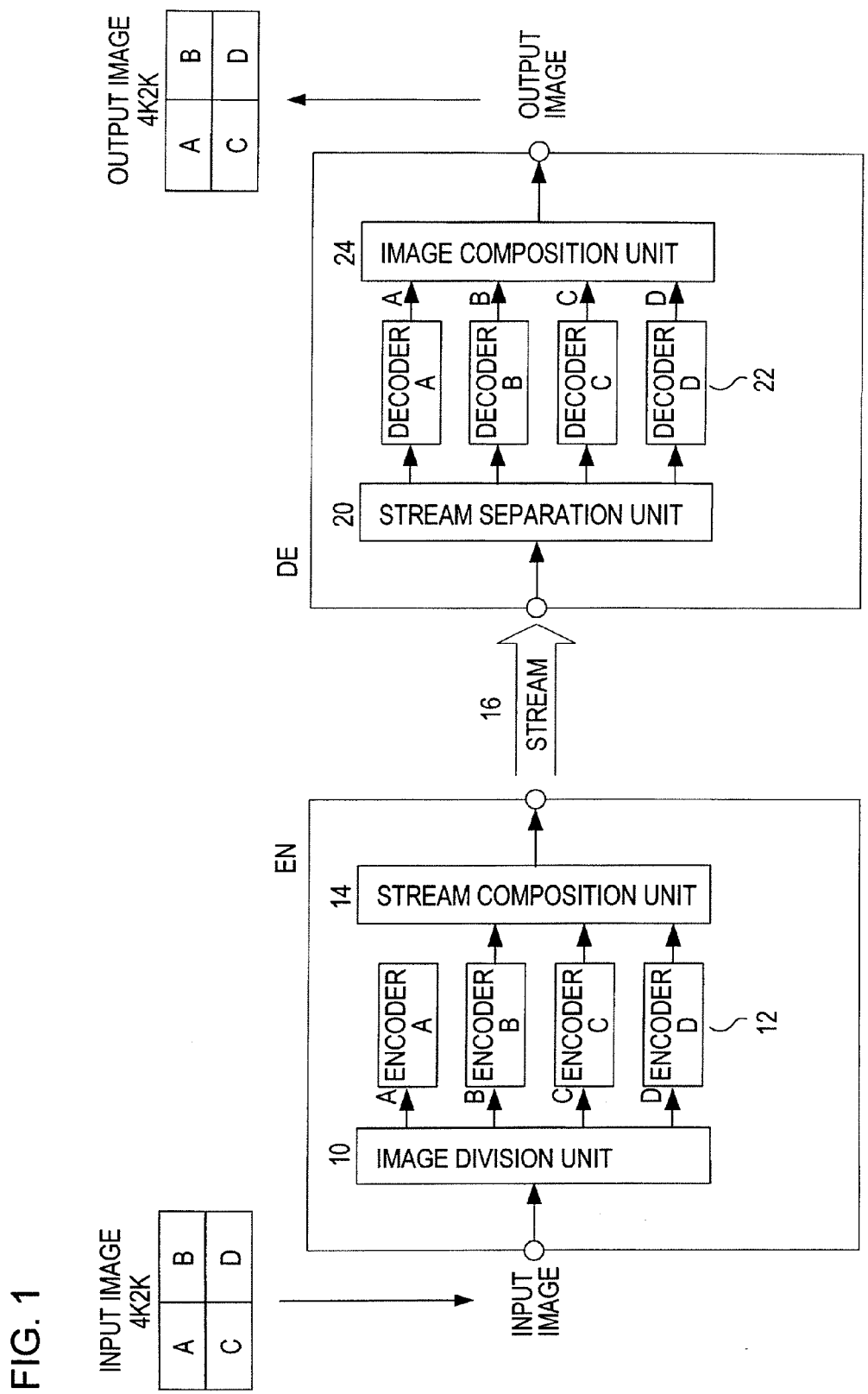
FIG. 1 is a configuration diagram of a moving image processing apparatus.

FIG. 1 is a configuration diagram of a moving image processing apparatus. The resolution of an input image constituting a moving image, for example, is 4K2K, which is four times higher than the resolution of high-definition image (2K1K). Herein, the moving image processing apparatus in FIG. 1 includes an encoder unit EN that includes an image division unit 10 that divides input image data into four pieces of data for divided images A, B, C, and D, an encoder group 12 that includes four sets of encoders that respectively encode the data for the divided images, and a stream composition unit 14 that composes encoded stream data.

Further, the moving image processing apparatus in FIG. 1 includes a decoder unit DE that includes a stream separation unit 20 that inputs the stream data 16 generated by the encoder unit EN and separates the stream data 16 into the stream data for the divided images A, B, C, and D, a decoder group 22 that includes four sets of decoders that respectively decode the stream data for the divided images and generate the data for the divided images A, B, C, and D, and an image composition unit 24 that composes the data for the divided images and outputs an output image of 4K2K.

Encoders and decoders which have been widespread with regards to the high-definition image are applied to the four sets of encoders of the aforementioned encoder group 12 and the four sets of decoders of the aforementioned decoder group 22, thereby constituting the moving image processing apparatus with reduction in costs.

Figure 2:
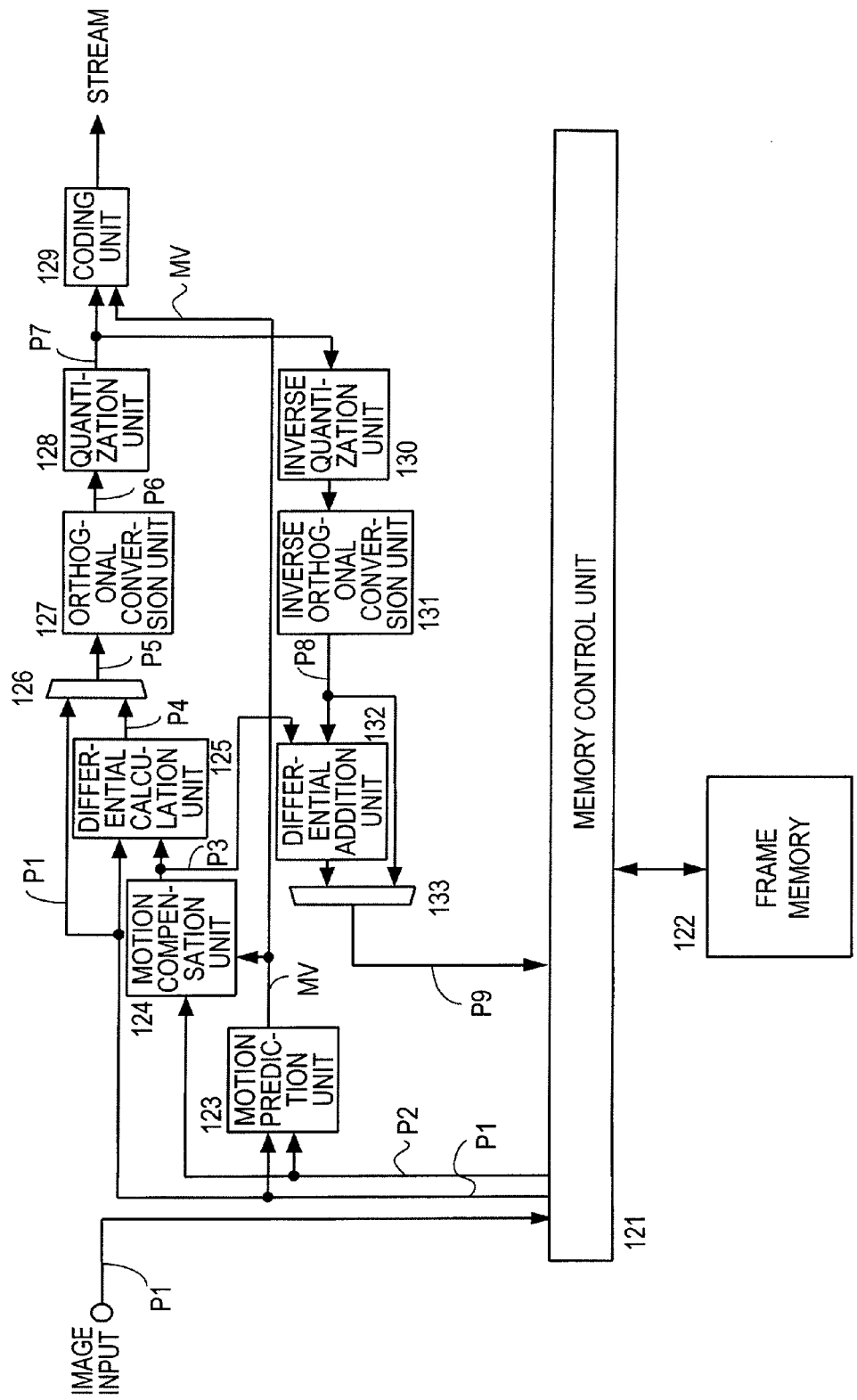
FIG. 2 is a diagram illustrating the example of the configuration of the encoder.

FIG. 2 is a diagram illustrating the example of the configuration of the encoder. The encoder has the configuration corresponding standards such as MPEG-2. First, the present image data P1 of the present frame constituting a moving image is inputted and stored in a frame memory 122 via a memory control unit 121. Also, for example, the reference image data P2 for previous frames is stored in the frame memory 122. Then, the encoder performs encoding processing for the present image data P1 of the present frame, for example, in units of macroblock in the form of 16 by 16 pixels.

First, with regards to an image in a macroblock in the present image data P1, a motion prediction unit 123 searches the corresponding image in the reference image data P2. When the motion prediction unit 123 successfully finds the corresponding image, the motion prediction unit 123 outputs the motion vector MV. Further, a motion compensation unit 124 generates the image data P3 for a motion compensation frame based on the reference image data P2 and the motion vector MV.

Next, a differential calculation unit 125 calculates a difference between the image data P3 for the motion compensation frame and the present image data P1 for the present frame to generate prediction error image data P4. The prediction error image data P4 is differential image data representing the difference between the image data P3, which is reproduced based on the reference image and the motion vector MV, and the present image data P1.

When the motion vector MV is detected, a selector 126 selects the prediction error image data P4. In contrast, when the motion vector MV is not detected, the selector 126 selects the present image data P1. Accordingly, the output image data P5 of the selector 126 is the pixel data for the prediction error image data P4 or the present image data P1 and is spatial area data for 16 by 16 pixels.

Subsequently, an orthogonal conversion unit 127, for example, performs DCT processing in units of block in the form of 8 by 8 pixels and converts the spatial area data P5 into frequency area data P6. The frequency area data P6 is constituted by coefficients of direct-current components and frequency components from a low frequency to a high frequency and is coefficient data for 16=8×8.

Then, a quantization unit 128 divides the frequency area data P6 by 8-by-8 division matrix and further divides by a common single Q value. The quantization matrix is such that a value with respect to the direct-current components or the low frequency component is small and a value with respect to the high frequency component is large, and is invariable in one frame. When the division is performed by 8-by-8 division matrix, the amount of data for the direct-current components or the low frequency component is not substantially reduced, and in contrast, the amount of data for the high frequency component is substantially reduced. Furthermore, the Q value is variably controlled for every macroblock in one frame (or for every block which is a unit of DCT processing) in such a manner that the stream data after the quantization and the coding is within a constant bit rate.

A coding unit 129 compresses quantization data P7 and the data for the motion vector MV, for example, based on run-length coding and outputs the stream data. Accordingly, when the motion vector MV is detected, the stream data is provided as data wherein the motion vector MV and data P7, in which the prediction error data P4 is orthogonally converted and quantized, are compressed. In contrast, when the motion vector MV is not detected, the stream data is provided as data wherein the data P7, in which the present image data P1 is orthogonally converted and quantized, is compressed.

Accordingly, when the motion vector MV is detected, the amount of data for the spatial area data P5 is smaller. Even under the condition that the bit rate of the stream data falls within the predetermined bit rate, the Q value corresponding to the quantization ratio is smaller, therefore it is more likely that the image quality after decoding is high. In contrast, when the motion vector MV is not detected, the amount of data for the spatial area data P5 is larger, the Q value needs to be larger under the aforementioned condition, and it is more likely that the image quality after decoding is low.

Further, the encoder in FIG. 2 includes an inverse quantization unit 130 that multiplies the Q value and the value of the division matrix, an inverse orthogonal conversion unit 131 that inversely converts the frequency area data into the spatial area data, a differential addition unit 132 that adds the image data P3 for the motion compensation frame to the spatial area data P8, which is outputted from the inverse orthogonal conversion unit 131, and a selector 133. The encoder performs a local decoding processing with the use of these circuits. When the motion vector MV is detected, the selector 133 selects the output data of the differential addition unit 132. When the motion vector MV is not detected, the selector 133 selects the spatial area data P8 and outputs a local decoding image, that is, image data P9 that is used as a reference image in the later-described encoding processing. The image data P9 outputted by the selector 133 is stored in the frame memory 122 as reference image data.

Figure 3:
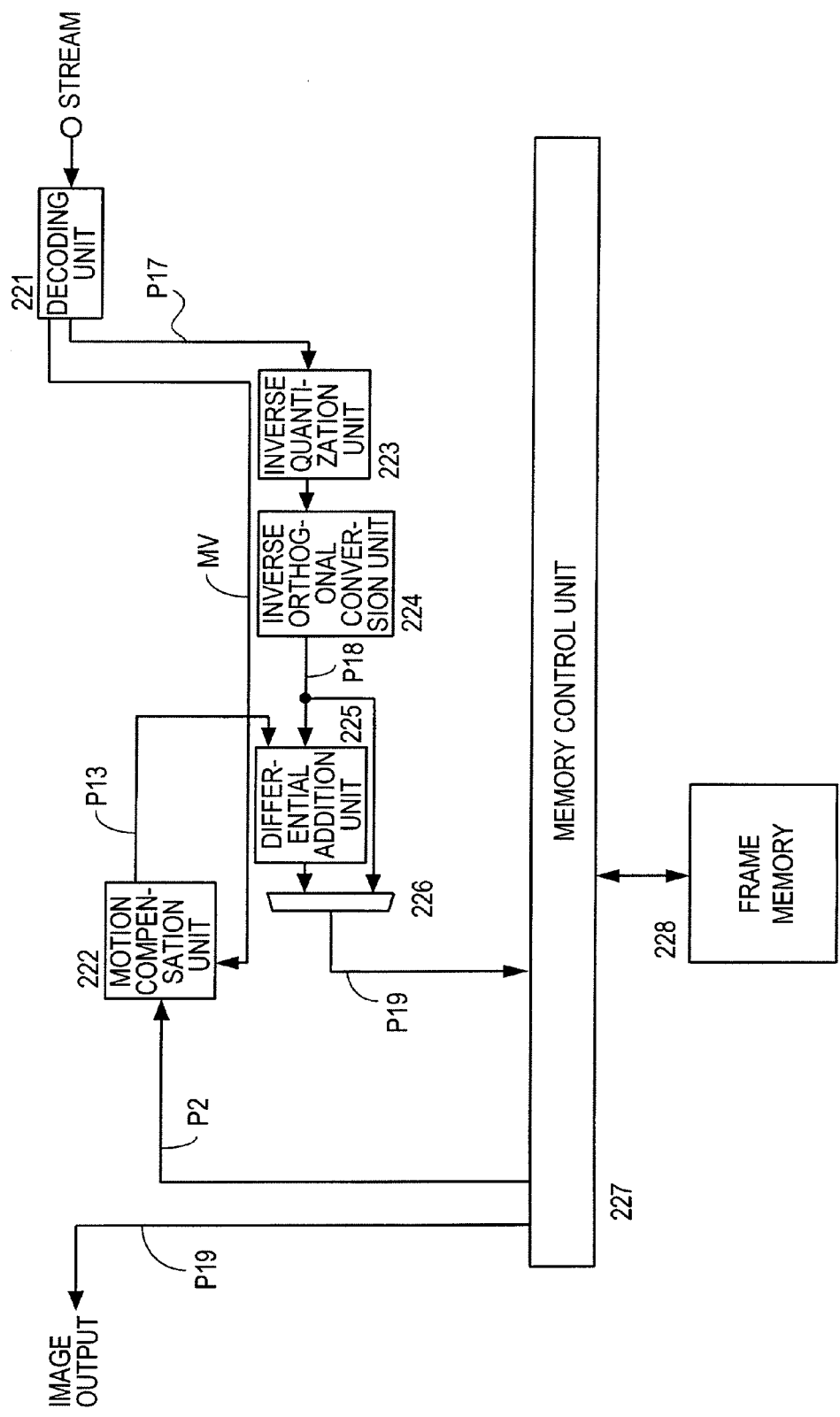
FIG. 3 is a diagram illustrating the example of the configuration of the decoder.

FIG. 3 is a diagram illustrating the example of the configuration of the decoder. The decoder performs the decoding processing in units of macroblock. First, a decoding unit 221 inputs the stream data, performs run-length decoding, and outputs the motion vector MV and the prediction error data P4 in FIG. 2, or data P17 corresponding to the original image data P1 in a case where there is no motion vector. Then, a motion compensation unit 222 generates the image data P13 for the motion compensation frame based on the reference image data P2 stored in the frame memory 228 and the motion vector MV. Also, with regards to the data P17, an inverse quantization unit 223 multiplies the Q value received from the encoder and multiplies the fixed value of the division matrix, and an inverse orthogonal conversion unit 224 performs inverse DCT conversion, thereby converting the frequency area data into spatial frequency data P18.

Further, a differential addition unit 225 adds the image data P13 for the motion compensation frame to the spatial frequency data P18, which is the prediction error data. When the motion vector MV is detected, a selector 226 selects the image data outputted by the differential addition unit 225. When the motion vector MV is not detected, the selector 226 selects the spatial frequency data P18 and outputs decoded image data P19. The decoded image data P19 is stored in the frame memory 228 by means of a memory control unit 227 and outputted as encoded image output.

Next, reduction in image quality in a case where ultra-high-definition images are encoded and decoded for each divided image will be described.

Regarding the divided image, when filtering processing such as image blurring and conversely, edge enhancement is performed, the pixels are interrupted on the boundary between the divided images, which causes the improper filtering processing. Accordingly, the image quality deteriorates. In addition to this cause, firstly, the images in the boundary portion between the divided images adjacently disposed are different in image quality on both sides of the boundary between the divided images, because of the difference between the Q values in the quantization processing for the divided images adjacently disposed. Secondly, when there occur a case where the motion vector is detected and a case where the motion vector is not detected, on both sides of the boundary between the divided images adjacently disposed, the image quality is high on the side where the motion vector is detected, and the image quality is low on the side where the motion vector is not detected.

Figure 4:
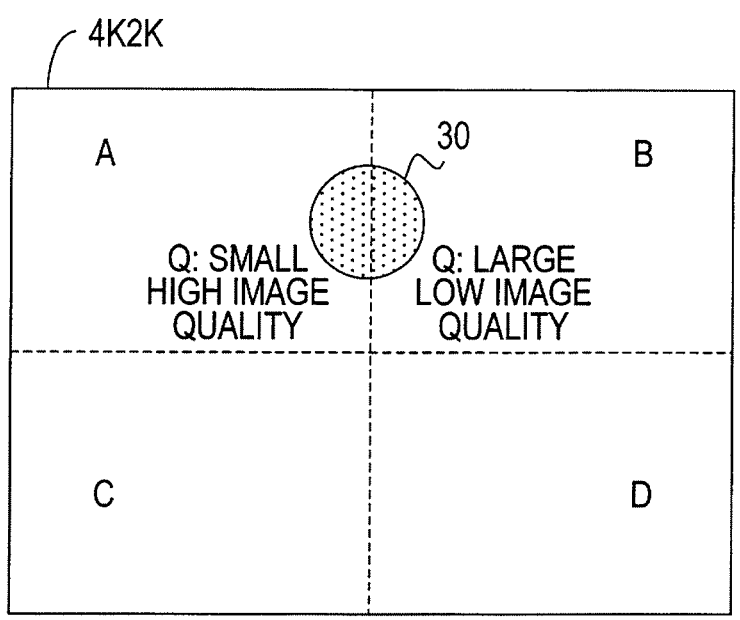
FIG. 4 is a diagram to describe the first cause for the difference in image quality in the periphery of the boundary between the divided images.

FIG. 4 is a diagram to describe the first cause for the difference in image quality in the periphery of the boundary between the divided images. FIG. 4 illustrates that the ultra-high-definition image of 4K2K is divided into four divided images A, B, C, and D. Then, a static object 30 is disposed on the boundary between the divided images A and B. In this case, when the divided images A and B are encoded, the motion vector is not detected in any of the divided images A and B, and the encoding processing (orthogonal conversion, quantization processing, and coding processing) is performed based on intra prediction, or the motion vector is detected in the image except for the static object 30, and the encoding processing for the prediction error image is performed based on the inter prediction.

In this case, the orthogonal conversion is performed for the different images in the divided images A and B, whereby different frequency area data is generated. Accordingly, in the subsequent quantization processing, there is a case where the Q values differ in the quantization processing for the frequency area data on the area on both sides of the boundary between the divided images A and B. As a result, a small Q value leads to the high image quality, and a large Q value leads to the low image quality. For example, in the divided image A, the amount of data for the coefficient of high frequency components in a lower right portion close to the boundary is low, and therefore the Q value is low, which leads to the high image quality. In contrast, in the divided image B, the amount of data for the coefficients of low and medium frequency components in a lower left portion close to the boundary is large, and therefore the Q value is large, which leads to the low image quality.

As a result, regarding the decoded divided images, there exist an area where the image quality is high and an area where the image quality is low, on both sides of the boundary between the divided images. Accordingly, it is assumed that the boundary is visible with regards to the composed image.

Thus, in the moving image compression (encoding) processing such as MPEG-2, when the efficiency of the motion prediction is excluded (that is, the efficiency of the motion prediction is equal with regards to both divided images A and B), the image quality according to the encoding is dominantly affected by the coefficient of the division matrix and the Q value in the quantization processing after the orthogonal conversion. The coefficient of the division matrix is normally a fixed value in one frame, but the Q value is variably controlled in accordance with the types of the image in order to keep the bit rate of the stream data within a constant value. Accordingly, even when there is no difference in motion compensation with regards to both divided images A and B, the difference in image quality occurs on both sides of the boundary.

Figure 5:
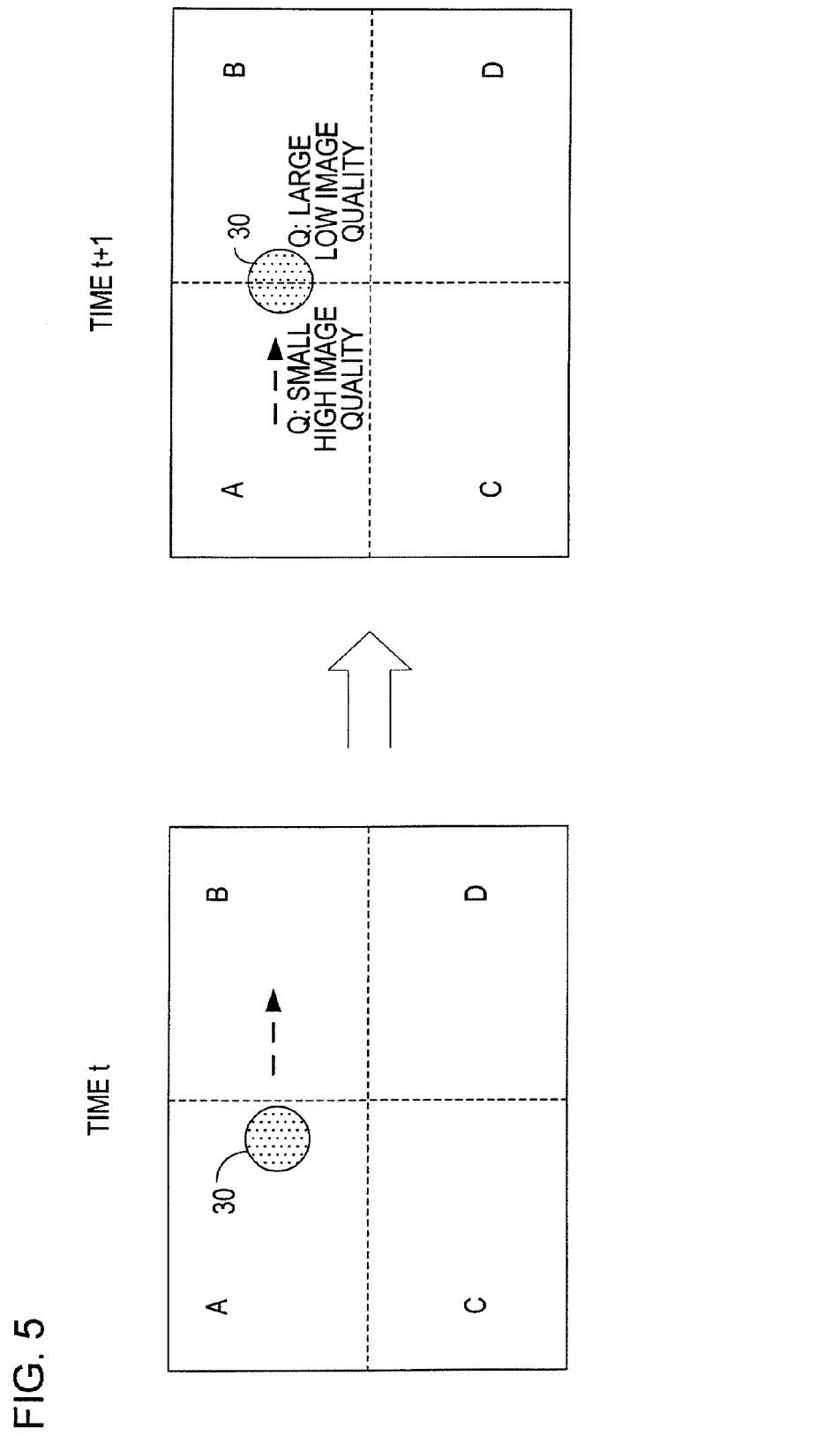
FIG. 5 is a diagram to describe the second cause for the difference in image quality in the boundary portion between the divided images.

FIG. 5 is a diagram to describe the second cause for the difference in image quality in the boundary portion between the divided images. FIG. 5 illustrates that the ultra-high-definition image of 4K2K is divided into four divided images A, B, C, and D. Then, on the line of boundary between the divided images A and B, there is an object 30 that moves in the direction from the divided image A to the divided image B. That is, at a time t, the object 30 is disposed only in the divided image A, and the object 30 transfers in the boundary area across both divided images A and B at a subsequent frame time t+1.

In this case, when the divided images A and B at the time t+1 are encoded, the motion vector is detected based on the macroblock of the boundary area in the divided image A, and the motion vector is not detected in the divided image B because the object 30 first appears at the time t+1. As a result, the amount of data prior to the quantization processing is larger in the boundary area of the divided image B in which the efficiency of the motion prediction is low (the motion vector is not detected), compared with the boundary area of the divided image A in which the efficiency of the motion prediction is high.

Therefore, it is controlled such that the Q value of the divided image B becomes larger than the Q value of the divided image A, in order to equalize the amount of data after the quantization processing in the divided images A and B, whereby it is assumed that the image quality in the periphery of the boundary in the divided image B becomes lower, and the image quality in the periphery of the boundary in the divided image A becomes higher.

In Patent Document 1, an overlapped area is provided in the periphery of the boundary, and data for the overlapped area is discarded from the decoded image data. However, no matter how much data is discarded, it is impossible to eliminate the difference in image quality in the periphery of the boundary at the time of composing the images. Accordingly, the effect of preventing the reduction in image quality is limited.

Figure 6:
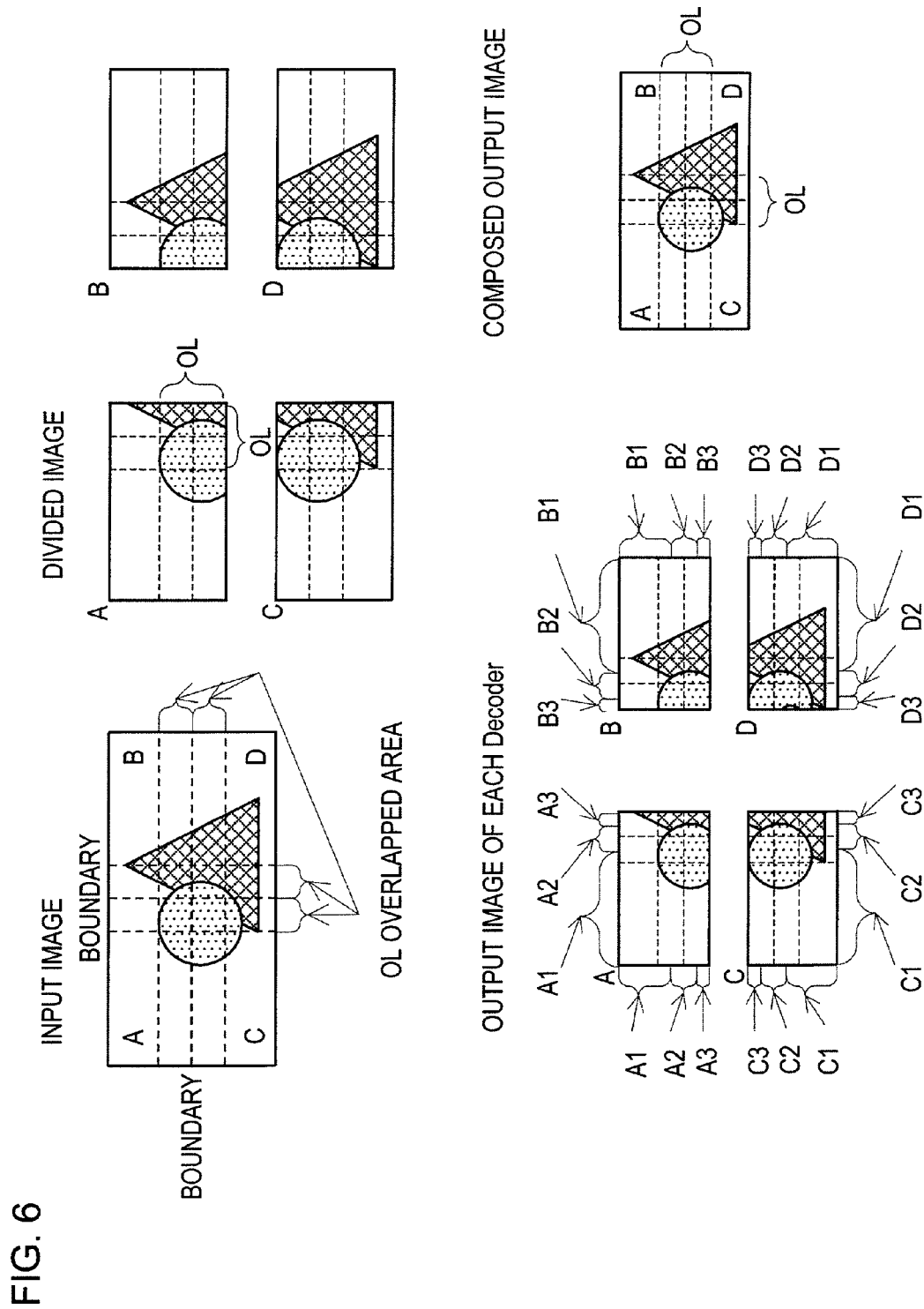
FIG. 6 is a diagram to describe the encoding and decoding processing of the present embodiment.
Figure 7:
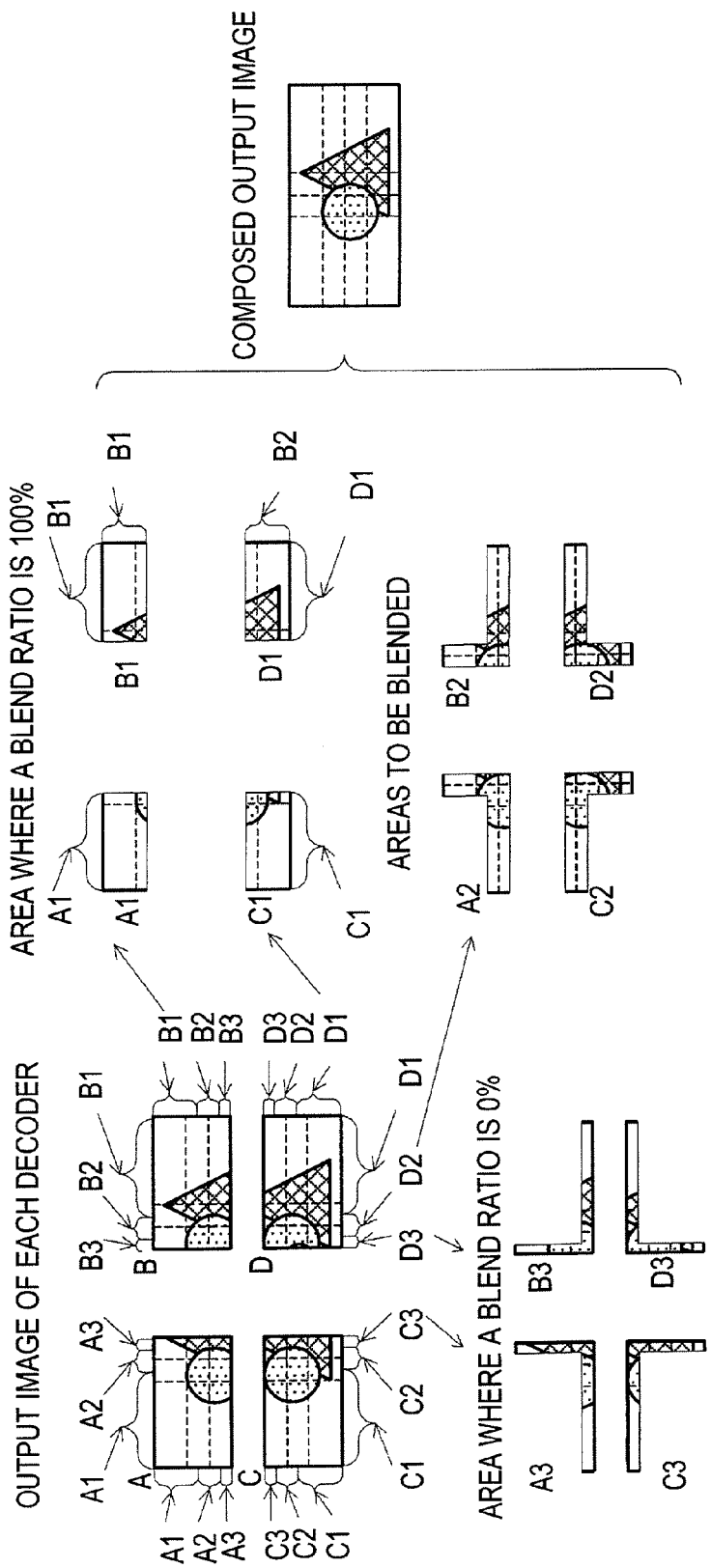
FIG. 7 is a diagram to describe the encoding and decoding processing of the present embodiment.

FIGS. 6 and 7 are diagrams to describe the encoding and decoding processing of the present embodiment. According to this processing, for example, in the encoding processing, an input image, which is the ultra-high-definition image of 4K2K, is divided into four divided images A, B, C, and D in such a manner as to include an overlapped area OL that spreads over the boundary. Then, the four divided images A, B, C, and D are respectively encoded by four encoders.

Subsequently, in the decoding processing, encoded stream data is separated into four divided image streams, which are respectively decoded by the four decoders. Then, except for the overlapped area OL, the decoded output image data (pixel data) for each divided image serves as the image data for the composed image as it is. In contrast, the overlapped area OL is classified into three areas as follows, and blend processing is performed for the decoded output image data for the respective divided images at each blend ratio.

That is, the overlapped area OL in the decoded output image A is classified into an area A3 where the blend ratio is zero, an area A2 where the blend ratio is gradually increased from zero toward the maximum value, and an area A1 where the blend ratio is the highest, and the areas are disposed from the peripheral portion to the internal portion of the decoded output image A. Other decoded output images B, C, and D are similarly classified.

Then, in the overlapped area OL in the divided images A and B, the blend processing is performed by the blend ratios of 100% and 0% in the areas A1 and B3, and the blend processing is performed by the blend ratio that is gradually changed from 0% to 100% (or from 100% to 0%) in the areas A2 and B2, and the blend processing is performed by the blend ratios of 0% and 100% in the areas A3 and B1. Then, as the result of the blend processing, unnatural image due to the difference in image quality is improved in the periphery of the boundary between the output images to be composed.

Figure 8:
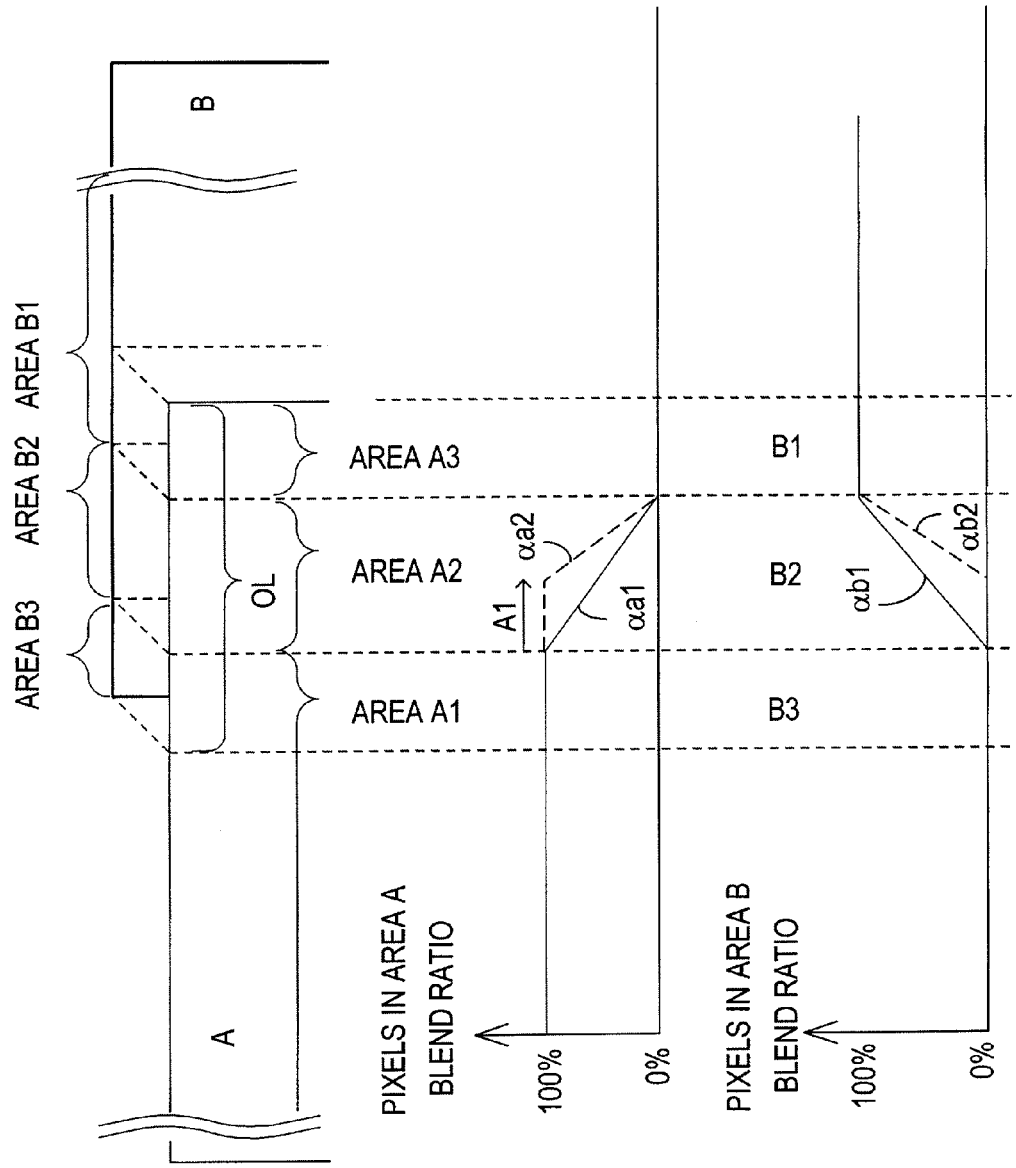
FIG. 8 is a diagram illustrating the example of the blend ratio in the overlapped area of the embodiment of the present invention.

FIG. 8 is a diagram illustrating the example of the blend ratio in the overlapped area of the embodiment of the present invention. In FIG. 8, the blend ratios $\alpha a1$ and $\alpha b1$ illustrated in a solid line will be described. From the right end of the periphery of the diagram to the center of the diagram, with regards to the blend ratio of the pixels, the divided image A is divided into the area A3 where the blend ratio is 0%, the area A2 where the blend ratio is gradually changed from 0% to 100%, and the area A1 where the blend ratio is the maximum 100%. The blend ratio of the divided image B, although the right and left are reversed, is similar to that of the divided image A.

When the divided images A and B are composed, in the overlapped area OL, the gradation values of the pixels that are disposed in the same position in the areas A1 and B3 are blended by the blend ratios $\alpha a1$ of 100% and the blend ratio $\alpha b1$ of 0%. For example, the mathematical operation of the blending is provided in such a manner that the following formula is applied to the gradation values PA and PB of the pixels that are disposed in the same position in the divided images A and B so as to obtain a gradation value PAB of the pixels after the blend processing.

$$PAB=PA*\alpha a1+PB*\alpha b1$$

The pixel data for the area B3 is substantially discarded due to the blend ratios $\alpha a1$ of 100% and the blend ratio $\alpha b1$ of 0%, and the pixel data for the area A1 is applied as it is. The area B3 is the peripheral area of the divided image B, wherein the image quality deteriorates due to the discontinuity of the pixels. In contrast, the area A1 is the internal area of the divided image A, wherein the continuity of the pixels is maintained, which prevents the image quality from deteriorating.

Further, in the overlapped area OL, the gradation values of the pixels that are disposed in the same position in the areas A2 and B2 are blended by the blend ratios $\alpha a1$ (change from 0% to 100%) and the blend ratio $\alpha b1$ (change from 100% to 0%) based on the aforementioned formula. Accordingly, even when the image quality between the divided images A and B of the decoded output image is different, the unnaturalness due to the difference of the image quality in the periphery of the boundary between the composed images is improved.

Then, in the overlapped area OL, the gradation values of the pixels that are disposed in the same position in the areas A3 and B1 are blended by the blend ratio $\alpha a1$ of 0% and the blend ratio $\alpha b1$ of 100%. The pixel data for the area A3 is substantially discarded due to the blend ratios, and the pixel data for the area B1 is applied as it is.

It is preferable that the size of the areas A3 and B3 where the pixel data is discarded is set to 16 pixels, for example, corresponding to one macroblock at the very least. Preferably, the larger the size of the areas A3 and B3 is set, the more the pixel data for the low-quality image is discarded. However, conversely, the overlapped area OL is extended more for that, and the peripheral pixels of the composed image are not appropriately encoded and decoded due to the restriction of the resolution of the encoders and decoders In the present embodiment, the aforementioned blend ratio is controlled to an appropriate value corresponding to the efficiency of the motion prediction of the divided images A and B in the overlapped area OL. An area where the blend ratio is higher than the adjacent side of the adjacent encoded divided imagesin the blend areas A2 and B2, is set larger for the area disposed on the side of the divided image in which the efficiency of the motion prediction is higher (the motion vector is larger) in the blend areas A2 and B2 in the overlapped area OL, compared with for the area disposed on the side of the divided image in which the efficiency of the motion prediction is lower (the motion vector is smaller).

In other words, variable control is performed in such a manner that the blend ratio on the side of the divided images in which the efficiency of the motion prediction is higher (the motion vector is larger) is set higher, and the blend ratio on the side of the divided images in which the efficiency of the motion prediction is lower (the motion vector is smaller)

is set lower, compared with the case where the efficiency of the motion prediction in the blend areas A2 and B2 is equal in the left and right divided images.

FIG. 8 illustrates blend ratios αa2 and αb2 by a dashed line in a case where the efficiency of the motion prediction on the side of the divided image A is higher than that on the side of the divided image B. When the efficiency of the motion prediction is equal in the blend areas A2 and B2, blend ratios αa1 and αb1 are set. That is, the area, where the blend ratio is higher than the adjacent side of the divided images A and B, is set larger for the side of the divided image A and set smaller for the side of the divided image B.

In other words, the blend ratios αa2 on the side of the divided image A is set higher, and the blend ratios αb2 on the side of the divided image B is set lower, compared with the blend ratios αa1 and αb1 illustrated in the solid line.

As is illustrated in the example of FIG. 5, when there exists the object that transfers from the divided image A to the boundary, the motion vector is detected in the divided image A, and the efficiency of the motion prediction is enhanced, whereby the high image quality of the decoded output image can be expected. In contrast, the motion vector is not detected in the divided image B, and the efficiency of the motion prediction is reduced, whereby it is assumed that the image quality of the decoded output image is reduced.

Accordingly, in FIG. 8, the area A1 where the blend ratio is 100% is extended to the right side (the side of the divided image B), and the area A2 in the periphery of the boundary of the divided image A is reduced. Following this, the area B3 where the blend ratio is 0% in the divided image B is extended to the right side, and the area B2 is reduced. Accordingly, with regards to the divided image A, when the blend ratio αa1 illustrated in the solid line and the blend ratio αa2 illustrated in the dashed line in the periphery of the boundary are compared, an inequality is represented as αa1<αa2. Conversely, with regards to the divided image B, when the blend ratio αb1 illustrated in the solid line and the blend ratio αb2 illustrated in the dashed line in the periphery of the boundary are compared, an inequality is represented as αb1>αb2.

Figure 9:
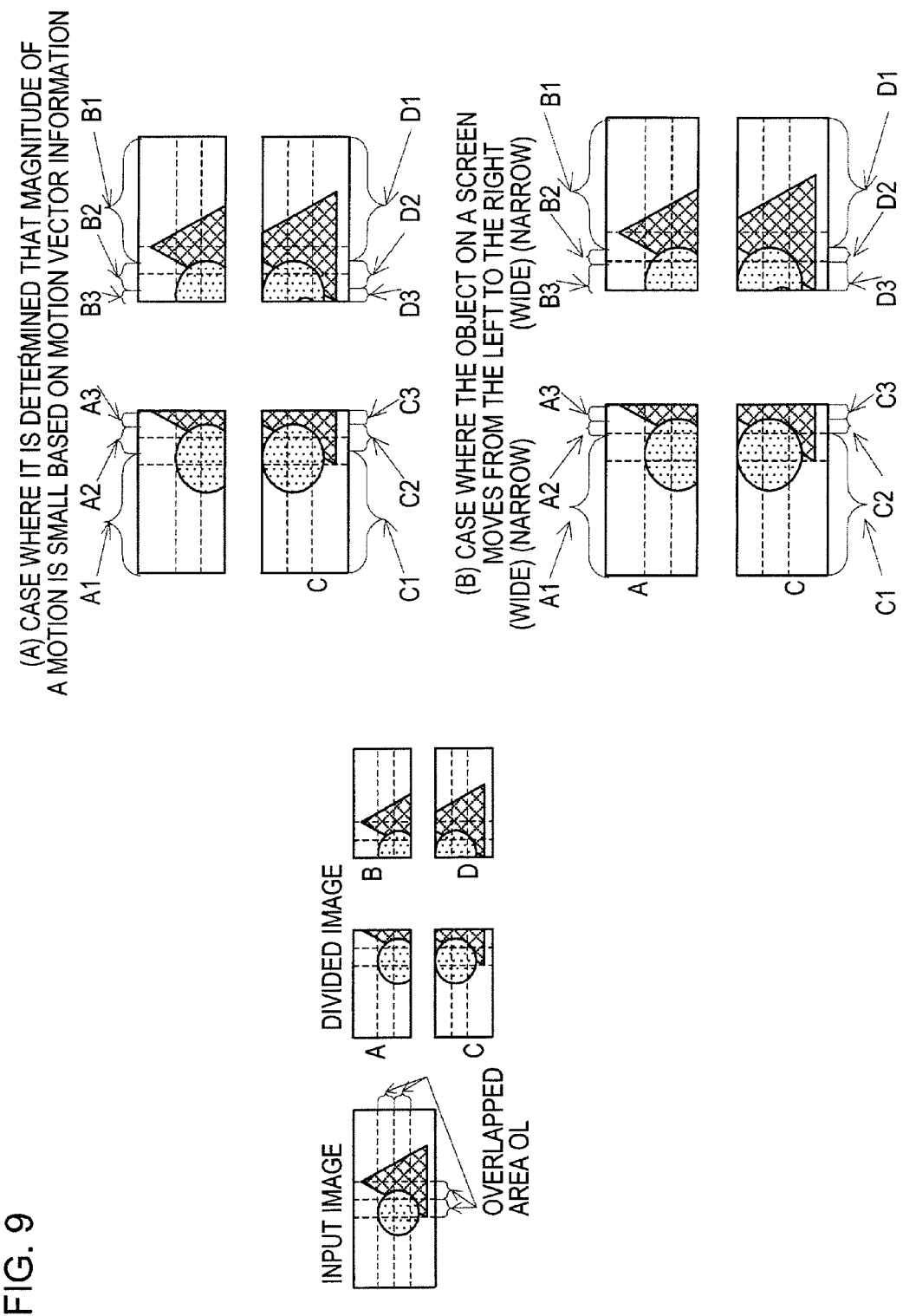
FIG. 9 is a diagram to describe the setting for the blend ratio of FIG. 8.

FIG. 9 is a diagram to describe the setting for the blend ratio of FIG. 8. In FIG. 9, areas A1, A2, and A3, areas B1, B2, and B3, areas C1, C2, and C3, and areas D1, D2, and D3 in the left and right divided images A and B and the left and right divided images C and D are respectively illustrated in a case (A) where it is determined that the magnitude of a motion in the left and right divided images is small based on the motion vector information (a case where the efficiency of the motion prediction is equal) and a case (B) where it is determined that the object on the screen moves from the left to the right based on the motion vector information (a case where the efficiency of the motion prediction on the left side is higher than the efficiency of the motion prediction on the right side).

For example, in a case (A) where the efficiency of the motion prediction is equal, the size of the area with regards to the divided images A and B is set as "A1=B1", "A2=B2", and "A3=B3". Accordingly, the areas where the blend ratio is higher than the adjacent side in the overlapped area OL between the divided images A and B (part of the areas A1 and A2 regarding the divided image A and part of the areas B1 and B2 regarding the divided image B) are set to an equal size.

In the case (B) where the efficiency of the motion prediction on the divided image A is higher than the efficiency of the motion prediction on the divided image B (the number of motion vectors is larger in a case where the object transfers from the left to the right on the screen), the sizes of the area are set as "A1>B1" and "A3<B3". Accordingly, the areas where the blend ratio is higher than the adjacent side in the overlapped area OL between the divided images A and B (the area A1 and the part of the area A2 regarding the divided image A and the areas B1 and the part of the area B2 regarding the divided image B) are set to a larger size, compared with the adjacent side.

Figure 10:
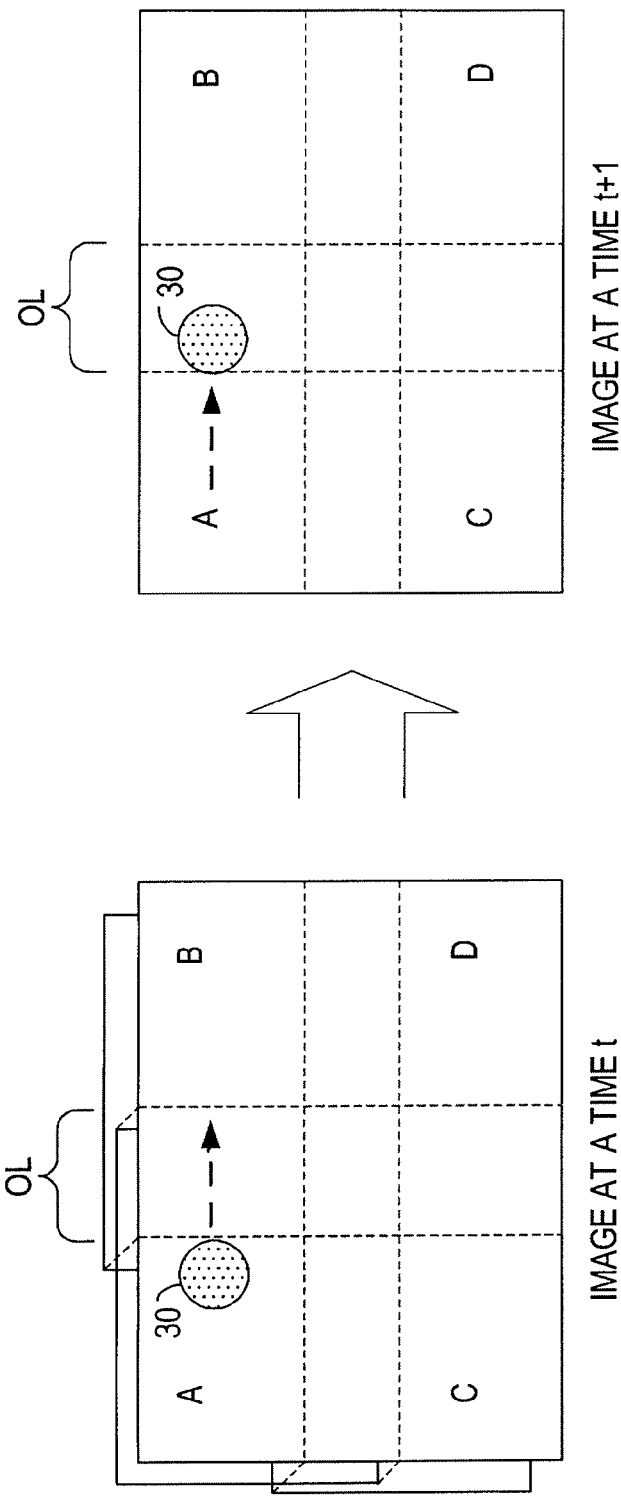
FIG. 10 is a diagram to describe the image composition processing in the encoder unit in the present embodiment.
Figure 11:
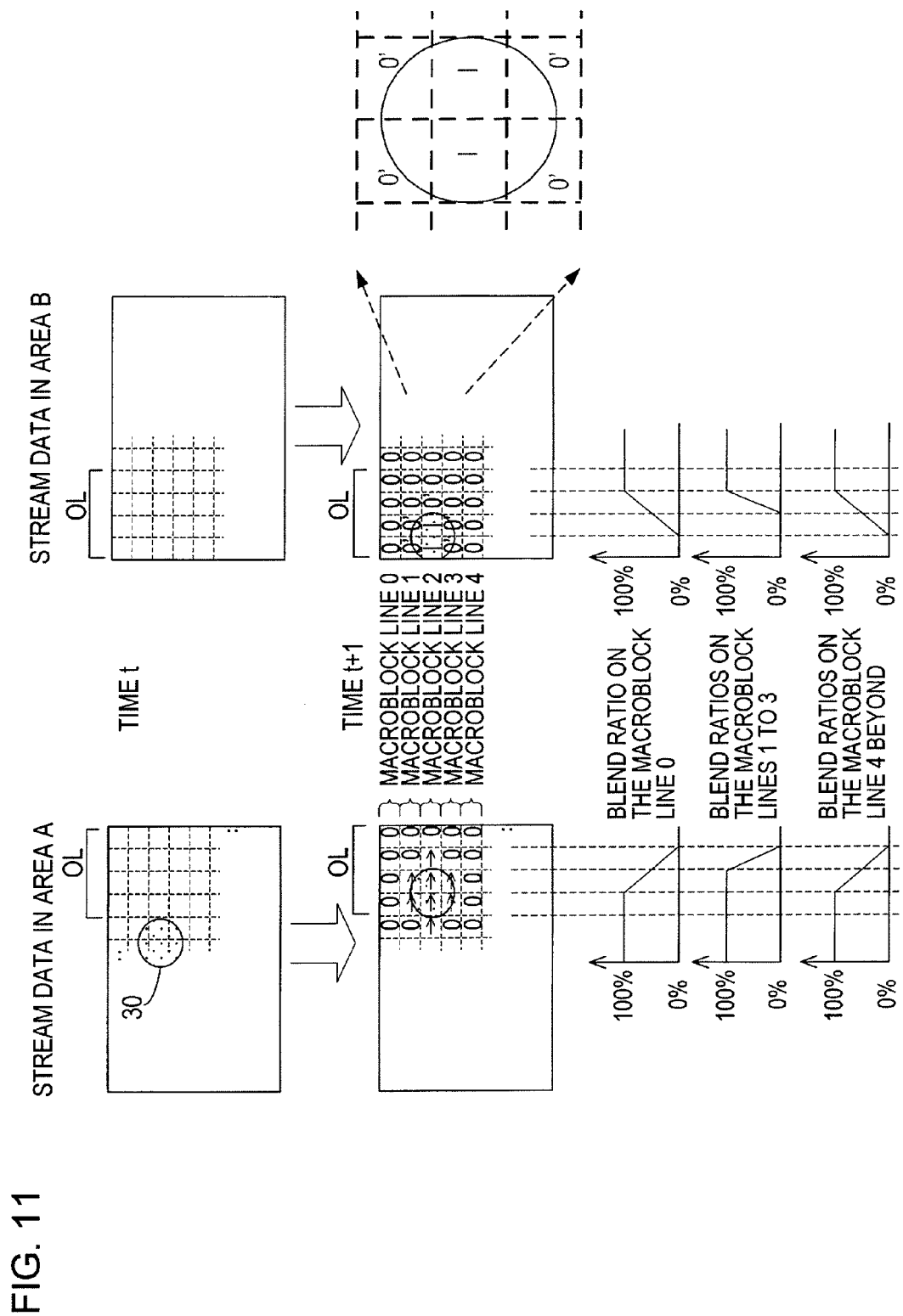
FIG. 11 is a diagram to describe the image composition processing in the encoder unit in the present embodiment.

FIGS. 10 and 11 are diagrams to describe the image composition processing in the encoder unit in the present embodiment. In FIG. 10, an image at a time t and an image at a time t+1 are illustrated. At the time t, there is disposed the object 30, which transfers from the left to the right in the divided image A, and the object 30 is not disposed in the divided image B. In contrast, at the time t+1, the object 30, which transfers from the left to the right, transfers in the overlapped area OL between the divided images A and B.

In this case, with regards to the divided image A at the time t+1, the motion vector according to the object 30 is generated. At the time t, the object 30 is not disposed in the divided image B, so that the motion vector regarding the object 30 is not generated with regards to the divided image B at the time t+1. Accordingly, regarding the image at the time t+1, the divided image A is encoded based on the motion vector with respect to the object 30 in the reference image at the time t, and the object 30 is encoded based on inter prediction, so the efficiency of the motion prediction is high. In contrast, with regards to the divided image B, the object 30 is not disposed in the reference image at the time t, and the motion vector is not generated, and the object 30 is encoded based on the intra prediction, so the efficiency of the motion prediction is low.

In FIG. 11, at the time t+1, the object 30 transfers from the left to the right in the overlapped area OL between the divided images A and B. The encoder unit searches the motion vector in units of macroblock MB. In the example in FIG. 11, on the side of the divided image A, the motion vector (illustrated by an arrow in the diagram) according to the object 30 is detected on the macroblock lines 1, 2 and 3. However, for example, there is no change in a background image in all the macroblocks MB on the macroblock lines 0 and 4, and the macroblocks MB with no object 30 on the macroblock lines 1, 2 and 3, so that zero motion vector (no motion) is detected.

In contrast, on the side of the divided image B, no motion vector according to the object 30 is detected. Then, as is described above, in the macroblocks MB where there exists no object 30, there is no change in the background image, and the zero motion vector (no motion) is detected. In the macroblocks MB (two macroblocks MB on the macroblock line 2) where only the object 30 exists, even the zero motion vector is not detected, and only the intra prediction (I) is performed. In the macroblocks MB (0') where the object 30 partially exists, the zero motion vector and the intra prediction in the area of the object 30 coexist.

Thus, it is preferable that in the overlapped area OL, the comparison of motion compensation (comparison of the motion vectors) with regards to the left and right divided images A and B is carried out in units of line of macroblock MB, which is a unit for searching the motion vector. That is, with regards to a respective plurality of macroblocks MB in the same macroblock line, a comparison between the macroblocks MB which are disposed at the same position in the left and right divided images A and B is made in terms of the motion vector from the left to the right direction, or components of the motion vector from the left to the right direction. Then, the adjustment of the blend ratio corresponding to the sum of comparison results is carried out in units of line of macroblock MB. It is noted that, in the overlapped area OL between the up-and-down divided images A and C, the adjustment is carried out in units of column of macroblock MB.

As is illustrated by the blend ratio of the divided images A and B in FIG. 11, with regards to both left and right divided images A and B, the motion vector from the left to the right direction is not detected on the macroblock MB lines 0 and 4. Accordingly, in the overlapped area OL whose lateral width is 4 MB, the blend ratio is changed in the central area of 2 MB from 100% to 0% or from 0% to 100%.

In contrast, on the macroblock lines 1, 2, and 3, the motion vector from the left to the right direction is detected in the left divided image A, and the motion vector from the left to the right direction is not detected in the right divided image B. Accordingly, in the overlapped area OL on the side of the divided image A, the blend ratio is set to 100% in two macroblocks MB on the left, and the blend ratio is reduced from 100% to 0% in one macroblock MB disposed on the right of the two macroblocks MB, and the blend ratio is set to 0% in one macroblock MB disposed on the leftmost end. In contrast, in the overlapped area OL on the side of the divided image B, the blend ratio is set to 100% in one macroblock MB only disposed on the leftmost end, and the blend ratio is increased from 0% to 100% in one macroblock MB disposed on the right of the two macroblocks MB disposed on the leftmost end, and the blend ratio is set to 0% in the two macroblocks MB disposed on the rightmost end.

Thus, the blend ratio is variably controlled in accordance with the difference in the efficiency of the motion compensation regarding the left and right divided images A and B in units of line of macroblock MB. On the macroblock lines 1, 2, and 3, the area where the blend ratio on the side of the divided image A is higher than the blend ratio on the side of the divided image B is set larger, compared with the areas on the macroblock lines 0 and 4. In other words, on the macroblock lines 1, 2, and 3, the area where the blend ratio on the side of the divided image A is higher than the blend ratio on the side of the divided image B is set larger than the area where the blend ratio on the side of the divided image B is higher than the blend ratio on the side of the divided image A.

Figure 12:
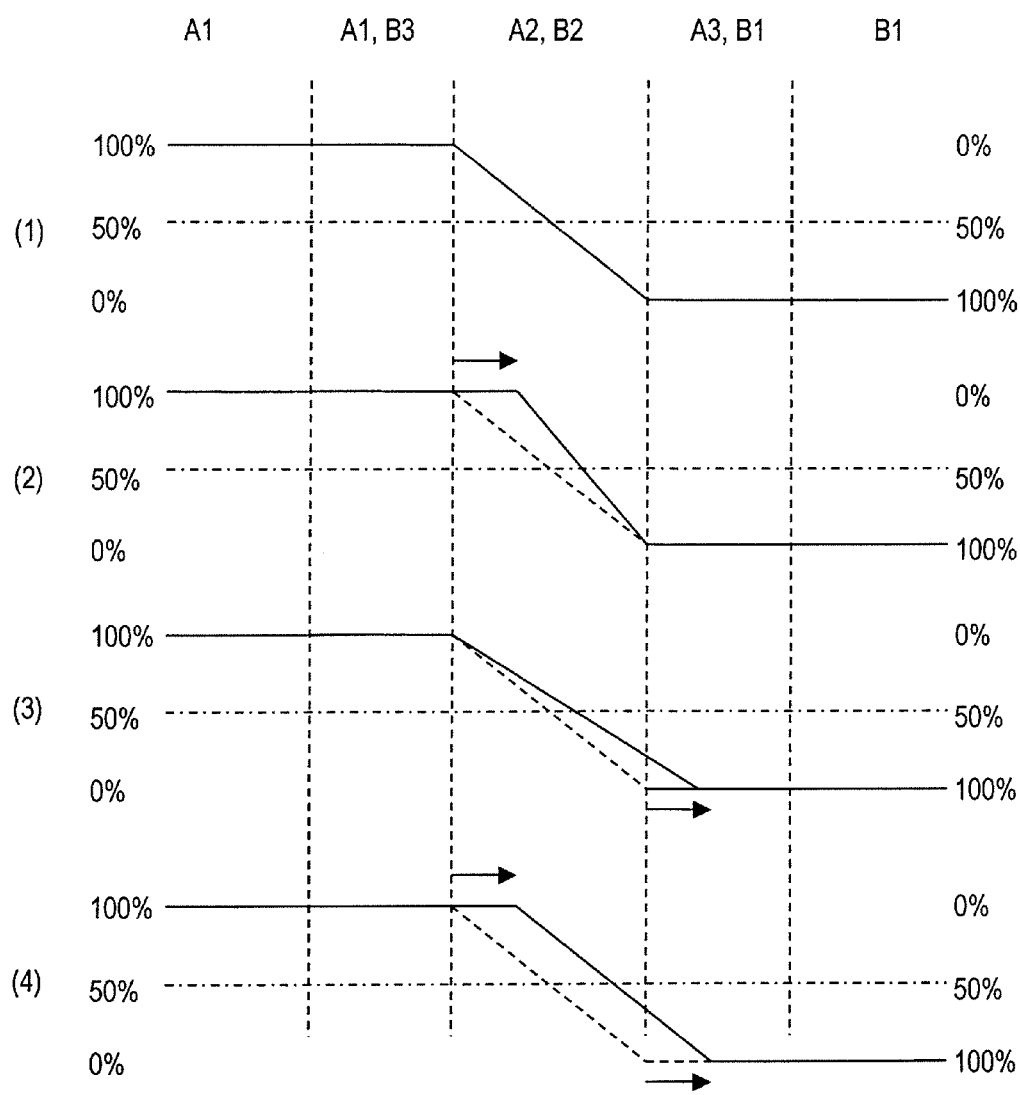
FIG. 12 is a diagram illustrating the example of variable control of the blend ratio.

FIG. 12 is a diagram illustrating the example of variable control of the blend ratio. FIG. 12 illustrates the example of the blend ratios of areas A1 and B3, areas A2 and B2, and areas A3 and B1 of the divided images A and B. In FIG. 12, the blend ratios 100%, 50%, and 0% illustrated on the left end of the diagram represent the blend ratios in the divided image A, and the blend ratios 100%, 50%, and 0% illustrated on the right end of the diagram represent the blend ratios in the divided image B.

The example of FIG. 12 (1) equally represents the blend ratios on the macroblock lines 0 and 4 in FIG. 11. That is, the size of the area where the blend ratio in the divided image A is higher than the blend ratio in the divided image B is equal to the size of the corresponding area on the side of the divided image B. The example of FIG. 12 (2) is the same as the blend ratios on the macroblock lines 1, 2 and 3 in FIG. 11. That is, the boundary (boundary between A1 and A2) where the blend ratio is reduced from 100% in the divided image A is transferred, as illustrated by an arrow, to the right of the diagram. Accordingly, the size of the area where the blend ratio in the divided image A is higher than the blend ratio in the divided image B is extended, compared with the size of the corresponding area of the divided image B.

As the modification of the example of FIG. 12 (2), the examples (3) and (4) are illustrated. In the example of FIG. 12 (3), the boundary between the area A2 where the blend ratio is reduced and the area A3 where the blend ratio is 0% in the divided image A is transferred, as illustrated by an arrow, to the right of the diagram. However, in this example, the area A3, where the image quality is low, in the divided image A of the example (1) is blended. Also, in the example of FIG. 12 (4), the boundary between the areas A1 and A2 and the boundary between the areas A2 and A3 in the divided image A are transferred, as illustrated by arrows, to the right of the diagram. In any of the examples of FIGS. 12 (2), (3), and (4), the dimension of the area where the blend ratio in the divided image A is higher than the blend ratio in the divided image B is larger than the dimension of the corresponding area of the divided image B.

Figure 13:
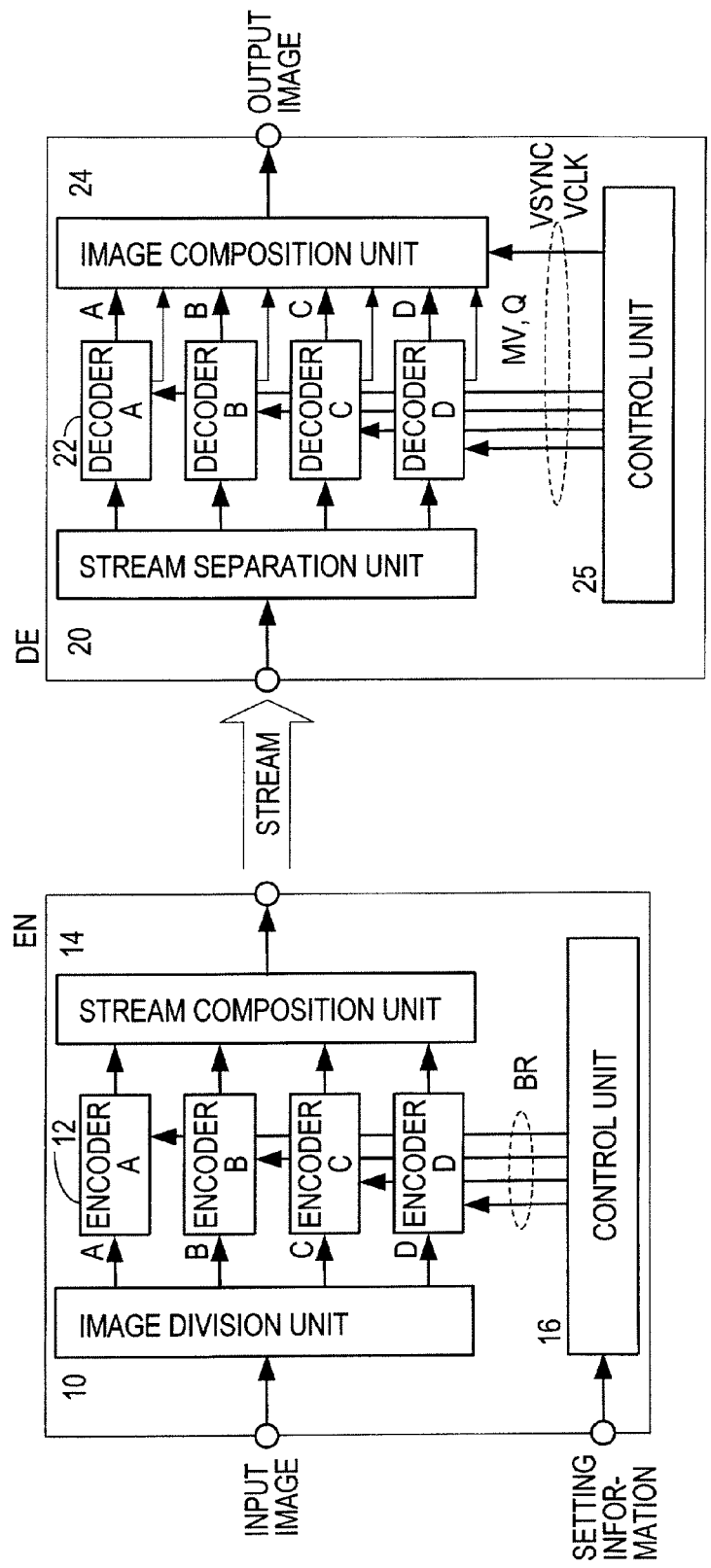
FIG. 13 is a configuration diagram of the moving image processing apparatus of the present embodiment.

FIG. 13 is a configuration diagram of the moving image processing apparatus of the present embodiment. The encode unit EN includes an image division unit 10 that divides, for example, the input image of 4K2K into the divided images including the overlapped area of 2K1K, an encoder group 12 that includes four sets of encoders that encode the divided images A, B, C, and D, a stream composition unit 14 that composes encoded divided image data and outputs the stream data, and a control unit 16 that controls the encoder group 12 based on inputted setting information. The configuration of the encoders in the encoder group 12 is illustrated in FIG. 2.

The setting information includes the entire bit rate that is a bit rate of the stream data per unit time. Then, the control unit 16 sets a bit rate BR of the encoder, which is obtained based on the inputted entire bit rate, to each encoder. As is described in FIG. 2, each encoder controls the Q value in the quantization processing in such a manner as to fall within the set bit rate BR. The Q value is variably controlled for each macroblock MB normally. Also, the Q value is controlled based on the amount of data, which is a subject of quantization, and the set bit rate BR. For example, when the amount of data is equal, and the bit rate BR is high, the Q value is controlled to a small value. In this case, the image quality is enhanced. However, when the bit rate BR is low, the Q value needs to be controlled to a large value. In this case, the image quality is reduced.

As is described above, in addition to attribution data for I picture, P picture, and Q picture, the stream data includes a bit stream in which the motion vector, quantization data of the prediction error image data, and the Q value are compressed.

On the other hand, the decoding unit DE includes a stream separation unit 20 that separates the stream data into the data for the divided images A, B, C, and D, a decoder group 22 that includes four sets of decoders that decode the separated stream data, an image composition unit 24 that composes decoded divided images, and a control unit 25 that controls the entire decoder.

In the embodiment of the present invention, the each decoder and the image composition unit synchronously operate in synchronism with VSYNC and VCLK signals from the control unit 25, and the image composition unit 24 that composes the decoded divided images generated by respective decoders variably sets the blend ratio in the overlapped area of the decoded divided image based on the information on the motion vector MV inputted from respective decoders, thereby performing composition processing.

Figure 14:
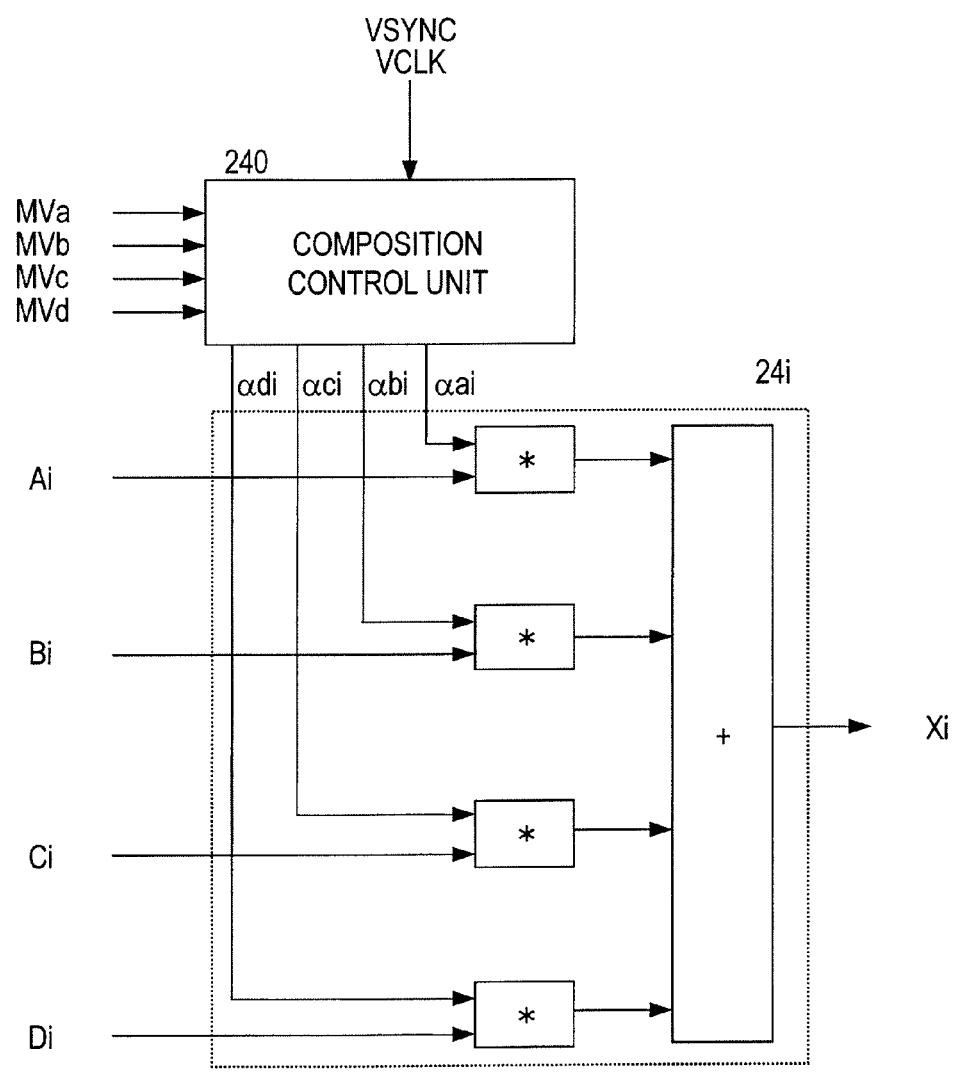
FIG. 14 is a configuration diagram illustrating the example of the configuration of the image composition unit 24.

FIG. 14 is a configuration diagram illustrating the example of the configuration of the image composition unit 24. The image composition unit 24 includes a composition unit 24*i* that composes the pixel data for both divided images corresponding to the same pixels in the composed image based on a blend ratio α. The composition unit 24*i*, which composes the divided images A, B, C, and D, includes a multiplier (asterisk) multiplies the pixel data Ai, Bi, Ci, and Di for the divided images corresponding to the same pixels by respective blend ratios αai, αbi, αci, and αdi, and an adder (+) that adds multiplication results and outputs composed pixel data Xi. Further, the image composition unit 24 includes a composition control unit 240. The composition control unit 240 operates in synchronism with the decoder unit DE based on the inputted VSYNC and VCLK signals, recognizes the positions of pixels in the screen, and determines the blend ratios αai, αbi, αci, and αdi based on the positions of the pixels, and the motion vectors MVa, MVb, MVc, and MVd corresponding to the divided images A, B, C, and D. For example, in the overlapped area in the periphery of the boundary between the two divided images A and B, as a subject of composition processing, the motion vector components corresponding to an object, which transfers from the left side to the right side (or transfers from the right side to left side) regarding the motion vector in the divided images A and B, are compared based on the motion vectors MVa, MVb from the decoder unit in units of line of the macroblock MB, and the blend ratios αai and αbi are controlled in accordance with the comparison results.

With regards to the method of comparing the motion vectors, for example, when K sets of macroblocks MB are included in each macroblock line in the overlapped area, the motion vector components corresponding to the object, which transfers from the left side to the right side (or transfers from the right side to left side), are compared for each of macroblocks MB which correspond to each other in the both divided images A and B. Based on the sum of K sets of the comparison results, the divided image, in which the efficiency of motion compensation is high, is specified, out of the divided images A and B.

Then, with regards to the control method of the blend ratio corresponding to the comparison results, when the efficiencies of motion compensation are equal, the area where the blend ratio is higher than the adjacent side in both divided images becomes equal in size on both divided images. Further, the control method is provided in a way that, when the efficiencies of motion compensation are different, the area where the blend ratio is higher than the adjacent side is controlled to be larger for the divided image where the efficiency of motion compensation is higher.

In the aforementioned present embodiment, with respect to the divided image where the efficiency of motion compensation is higher, the area where the blend ratio is higher than the adjacent side is larger. However, as the modification, in addition to, or in place of the comparison of the efficiency of the motion compensation, with respect to the divided image where the Q value at the time of quantization processing is smaller, the area where the blend ratio is higher than the adjacent side may be larger.

That is, the quantization processing is carried out for the prediction error image data (differential image data between the original image and the motion compensation image) that is not generated by the motion compensation. Then, the Q value, which is a divisor at the time of quantization processing, is variably set for each macroblock based on the bit rate and the like. Generally, when the Q value is larger, the image quality is lower. When the Q value is smaller, the image quality is higher. Moreover, the Q value is included in the stream data and transmitted from the side of the encoders to the side of the decoders.

Accordingly, preferably, the image composition unit 24 in the decoder unit determines whether the image quality of the decoded image regarding both divided images is better or not based on the Q value for each line of the macroblock MB in the overlapped area, and controls in such a manner that an area where the blend ratio is higher is extended on the side where the level of the image quality is better. In particular, when the efficiencies of the motion compensation of both divided images are approximately equal, the blend ratio is variably controlled based on the Q value in the overlapped area. Accordingly, decoded images of higher image quality is reflected on the composed image, thereby improving the image quality of the composed image.

Second Embodiment

Figure 15:
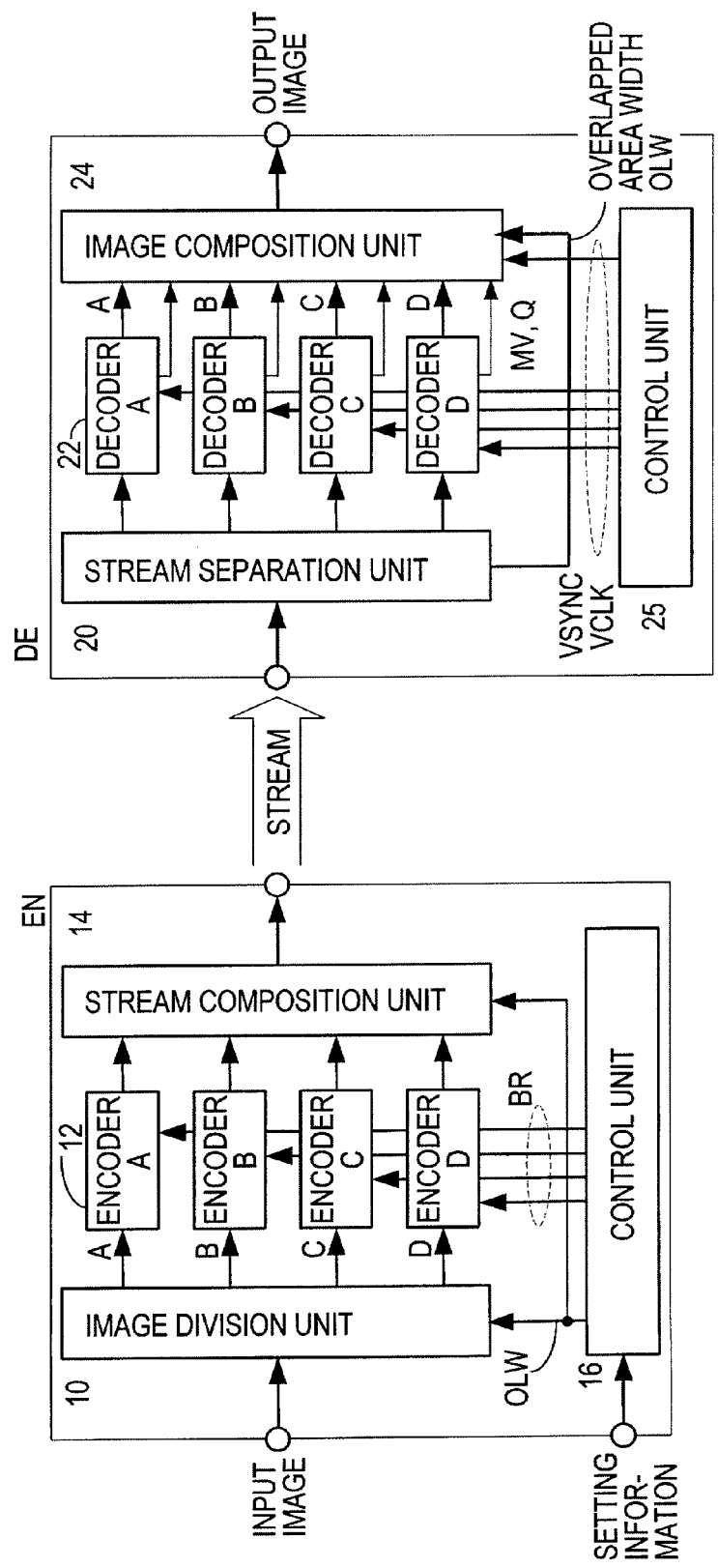
FIG. 15 is a configuration diagram of a moving image processing apparatus of the second embodiment.

FIG. 15 is a configuration diagram of a moving image processing apparatus of the second embodiment. The differences between the configuration illustrated in FIG. 15 and the configuration illustrated in FIG. 13 are as follows; (1) the control unit 16 determines the overlapped area width OLW of the divided images to set the overlapped area width OLW in the image division unit 10 in accordance with the information on the entire bit rate that is inputted to the control unit 16 of the encoder unit EN, (2) the stream composition unit 14 outputs the stream data including the set overlapped area width OLW, and (3) in the decoder unit DE, the image composition unit 24 composes the decoded divided images in accordance with the overlapped area width OLW. Further, the image composition unit 24 controls the blend ratio α for the purpose of the composition in accordance with the overlapped area width OLW.

FIG. 16 is a diagram illustrating the relation between the bit rate and the overlapped area width OLW in the second embodiment. The entire bit rate with respect to the stream data is set in the encoder unit EN. The entire bit rate is the amount of data regarding the stream data per unit time. When the entire bit rate is higher, the Q value in the quantization processing is set to a smaller value. Accordingly, the degradation in the decoded image is expected to be lower, and the line of boundary between the divided images is not visible. Conversely, when the entire bit rate is lower, the Q value needs to be set to a larger value in such a manner as to fall within the bit rate. Accordingly, the degradation in the decoded image is expected to be higher, and the line of boundary between the divided images is visible.

Accordingly, preferably, when the entire bit rate is higher, the overlapped area width OLW is narrowed, and when the entire bit rate is lower, the overlapped area width OLW is extended. That is, the control unit 16 of the encoder unit EN variably controls the overlapped area width OLW in accordance with the set entire bit rate.

When the entire bit rate is low and it is expected that the image quality is reduced, in particular, it is likely that the image quality of the decoded divided images on both sides is reduced, and it is likely that the difference of image quality is increased. This tendency is prominently noticeable in the moving image rather than the static image. That is, when the object which moves in the moving image strides over the area between the divided images as illustrated in FIG. 10, the motion compensation is performed on the side of the divided image A, whereby the amount of data for the prediction error image is small and in contrast, the motion compensation is not performed so much on the side of the divided image B, whereby the amount of data for the prediction error image is increased. Thus, when there is the difference in the amount of data for the prediction error image as a subject of the quantization processing, and the entire bit rate is low, the deterioration of images on the side of the divided image B where the amount of data for the prediction error image is larger is more visible, compared with the side of the divided image A where the amount of data for the prediction error image is smaller.

In this case, in particular, the overlapped area width OLW is set wider, so that the influence of the side of the divided image B where the deterioration of image quality is substantially remarkable is preferably restrained. In the first embodiment, the blend ratio is variably controlled based on the efficiency of the motion compensation, but the area to be blended is limited to the overlapped area. Accordingly, when the image quality is deteriorated over the overlapped area, it is not sufficient to change the blend ratios to restrain the deterioration of the image quality.

Accordingly, in the second embodiment, the width of the overlapped area is variably controlled in accordance with the set entire bit rate on the side of the encoder unit, thereby appropriately restraining the aforementioned deterioration of the image quality. For example, as to the overlapped area, when the entire bit rate is higher, preferably, the area A3 where the minimum blend ratio is 0% is made up of only one macroblock MB, and the blend area A2 is made up of only one macroblock MB, whereby the width of the entire overlapped area is set to the two macroblocks MB.

As is described above, according to the embodiment, with regards to the blend ratio at the time of composing the decoded divided images, the area where the blend ratio is higher in the divided image having a higher efficiency of the motion compensation is set larger than the area on the opposite side of the divided image, based on the efficiencies of the motion compensation of both divided images. Accordingly, even when there occurs the difference in the image quality of both decoded divided images based on the efficiencies of the motion compensation, the deterioration of the image quality in the periphery of the boundary of the composed image is restrained by appropriately selecting the blend ratio.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The invention claimed is:

1. A moving image processing apparatus comprising:
    an encoder unit configured to include a plurality of encoders which encode a plurality of divided images respectively to generate encoded divided image data, wherein each of images of a moving image is divided into the plurality of divided images such that each of the plurality of divided images includes an overlapped area with an adjacent divided image of the plurality of divided images; and
    a decoder unit configured to include a plurality of decoders which respectively decode the plurality of encoded divided image data inputted from the encoder unit and respectively extract information on motion vectors of the divided images, and a composition unit which blends a plurality of decoded divided images, decoded and generated by the plurality of decoders respectively, in the overlapped area to output the each of images of the moving image,
    wherein the composition unit determines a blend ratio of the overlapped area of the adjacent divided images based on a number of the motion vectors in the overlapped area of each of the adjacent divided images.

2. The moving image processing apparatus according to claim 1,
    wherein the blend ratio is increased as the number of motion vectors in the overlapped area is increased.

3. The moving image processing apparatus according to claim 2,
    wherein the motion vector which determines the blend ratio is a motion vector having a component of a direction of proceeding from the overlapped area to any side of the divided images.

4. The moving image processing apparatus according to claim 1,
    wherein, compared with a case where efficiencies of motion prediction in the overlapped area with regards to data for the adjacent encoded divided images are equal, the composition unit sets the blend ratio in such a manner that the blend ratio on a side of the divided image, where the efficiency of the motion prediction is higher, is set to higher and that the blend ratio on a side of the divided image, where the efficiency of the motion prediction is lower, is set to lower.

5. The moving image processing apparatus according to claim 1,
    wherein the overlapped area of the decoded divided images includes a first area where the blend ratio is 0%, a second area where the blend ratio is gradually increased, and a third area where the blend ratio is maximum, in a direction from a periphery to an internal portion of the decoded divided image.

6. The moving image processing apparatus according to claim 5,
    wherein the third area is wider in a case where the motion vectors are more than that of the adjacent divided image, compared with a case where the motion vectors are less than that of the adjacent divided image.

7. The moving image processing apparatus according to claim 6,
    wherein the second area is narrower in a case where the motion vectors are more than that of the adjacent divided image, compared with a case where the motion vectors are less than that of the adjacent divided image.

8. The moving image processing apparatus according to claim 1,
    wherein the composition unit sets the blend ratio for column or row of a macroblock, which is a unit of searching the motion vector in the overlapped area.

9. The moving image processing apparatus according to claim 1,
    wherein the encoder unit includes a division unit configured to divide the divided image from the plurality of divided images of the moving image, and
    compared with a case where a bit rate set to the encoded divided image data is a first bit rate, in a case where the bit rate is a second bit rate higher than the first bit rate, the division unit narrows the overlapped area.

10. The moving image processing apparatus according to claim 1,
    wherein the encoders include a quantization processing unit configured to perform quantization by dividing quantization target data by a Q value, and wherein the decoders include a reverse quantization unit configured to perform reverse quantization by multiplying reverse quantization target data by the Q value, and wherein the composition unit sets the area where the blend ratio is higher than the adjacent divided image in the overlapped area to be wider, in a side of the divided image where the Q value in the overlapped area is smaller, than in a side of the divided image where the Q value in the overlapped area is larger.

11. A moving image processing apparatus comprising:

a plurality of decoders configured to respectively input a plurality of encoded divided image data that is generated by respectively encoding a plurality of divided images, and configured to decode the plurality of encoded divided image data respectively and extract information on motion vectors of the divided images respectively, wherein each of images of a moving image is divided into the plurality of divided images such that each of the plurality of divided images includes an overlapped area with an adjacent divided image of the plurality of divided images; and a composition unit configured to blend a plurality of decoded divided images, decoded and generated by the plurality of decoders respectively, in the overlapped area to output the each of images of the moving image, wherein the composition unit determines a blend ratio of the overlapped area of the adjacent divided images based on a number of the motion vectors in the overlapped area of each of the adjacent divided images.

12. The moving image processing apparatus according to claim 11, wherein the blend ratio is increased as the number of motion vectors in the overlapped area is increased.

13. The moving image processing apparatus according to claim 12, wherein the motion vector which determines the blend ratio is a motion vector having a component of a direction of proceeding from the overlapped area to any side of the divided images.

* * * * *